(12) United States Patent
Liu et al.

(10) Patent No.: US 9,725,616 B2
(45) Date of Patent: Aug. 8, 2017

(54) FLUORINE-MODIFIED EPOXY ACRYLIC RESIN, UV-CURABLE VARNISH AND METHOD FOR PREPARING THE SAME, AND METHOD FOR COATING THE VARNISH ON A SUBSTRATE

(71) Applicant: BOE TECHNOLOGY GROUP CO., LTD., Beijing (CN)

(72) Inventors: Lu Liu, Beijing (CN); Jianshe Xue, Beijing (CN); Shi Shu, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 70 days.

(21) Appl. No.: 14/235,312

(22) PCT Filed: Aug. 5, 2013

(86) PCT No.: PCT/CN2013/080793
§ 371 (c)(1),
(2) Date: Jan. 27, 2014

(87) PCT Pub. No.: WO2014/194559
PCT Pub. Date: Dec. 11, 2014

(65) Prior Publication Data
US 2015/0291835 A1    Oct. 15, 2015

(30) Foreign Application Priority Data

Jun. 6, 2013 (CN) .......................... 2013 1 0223543

(51) Int. Cl.
C08F 2/46 (2006.01)
C08F 2/50 (2006.01)
C08G 61/04 (2006.01)
C09D 163/10 (2006.01)
C08G 59/17 (2006.01)
C08K 3/30 (2006.01)
C08K 3/34 (2006.01)
C08K 3/36 (2006.01)
C09D 163/00 (2006.01)
C08G 59/16 (2006.01)
C08G 59/14 (2006.01)
C08G 59/30 (2006.01)

(52) U.S. Cl.
CPC ....... C09D 163/10 (2013.01); C08G 59/1461 (2013.01); C08G 59/1466 (2013.01); C08G 59/1494 (2013.01); C08G 59/308 (2013.01); C08K 3/30 (2013.01); C08K 3/34 (2013.01); C08K 3/36 (2013.01); C09D 163/00 (2013.01); C08K 2003/3045 (2013.01)

(58) Field of Classification Search
CPC ...... C09D 163/10; C09D 163/00; C08K 3/36; C08K 2003/3045; C08K 3/30; C08K 3/34; C08G 59/1466

USPC .......... 522/42, 33, 6, 1, 71, 189, 184; 520/1
See application file for complete search history.

(56) References Cited

FOREIGN PATENT DOCUMENTS

| CN | 101747490 A | 6/2010 |
|---|---|---|
| CN | 102516497 A | 6/2012 |
| CN | 102786839 A | 11/2012 |
| CN | 102807805 A | 12/2012 |
| CN | 102898932 * | 1/2013 |
| CN | 102964969 A | 3/2013 |
| CN | 103253988 A | 8/2013 |
| JP | 2006-323039 * | 11/2006 |
| JP | 2006323039 A | 11/2006 |
| JP | 2011032352 A | 2/2011 |

OTHER PUBLICATIONS

Asano et al, Nov. 30, 2006, JP 2006-323039 Machine Translation.*
Asano et al, JP 2006-323039 Machine Translation, Nov. 30, 2006.*
Yan et al, CN 102898932 Machine Translation, Jan. 30, 2013.*
Chinese Third Office Action Dated Feb. 5, 2016, Application No. 201310223543.5, 9 Pages.
Chinese Office Action CN 2013102235435 dated Dec. 29, 2014; 10 pages [with English Translation].
Han Jing et al., "Synthesis and Characteristics of UV-Curable Perfluorinated Epoxy Acrylate"; Polymer Material Science and Engineering, vol. 24, No. 3; Published Mar. 15, 2008; pp. 36-40.
Chinese Office Action CN 2013102235435 dated Aug. 5, 2015; 9 pages [with English Translation].
PCT International Search Report and Written Opinion PCT/CN2013/080793 dated Mar. 13, 2014, 20 pages [with English Translation].
Notification of Reexamination for Chinese Application No. 201310223543.5, dated Apr. 19, 2017, 10 Pages.

(Continued)

*Primary Examiner* — Jessica E Whiteley
(74) *Attorney, Agent, or Firm* — Brooks Kushman P.C.

(57) ABSTRACT

The present invention discloses a fluorine-modified epoxy acrylic resin, an UV-curable varnish and a method for preparing the same, and a method for coating the varnish on a substrate. The fluorine-modified epoxy acrylic resin is prepared by a process including the following steps: generating an epoxy acrylic resin via a ring-opening esterification reaction between an unsaturated mono-carboxylic acid and at least one epoxy group in an epoxy resin; and generating an epoxy acrylic resin containing fluorinated side groups via an esterification reaction between a fluorocarboxylic acid or a fluorocarboxylic acid anhydride and at least one hydroxy group in the epoxy acrylic resin. The UV-curable varnish according to the invention is prepared based on the fluorine-modified epoxy acrylic resin. When the varnish is applied to the surface of a substrate, at least one performance of the material, thereby the service life of the material itself may be improved.

16 Claims, No Drawings

(56) References Cited

OTHER PUBLICATIONS

M.G.D. Van Der Grinten et al., Surface Segregation of Fluorine-Ended Monomers, Journal of Colloid and Interface Science, accepted Mar. 13, 1996, pp. 511-515, Article No. 0495, 5 pages.
Chief editor Heping Li, Principle and Technology of Adhesive Production, paragraphs 1-5 on p. 477, Chemical Industry Press, Aug. 2009, 4 pages.

* cited by examiner

FLUORINE-MODIFIED EPOXY ACRYLIC RESIN, UV-CURABLE VARNISH AND METHOD FOR PREPARING THE SAME, AND METHOD FOR COATING THE VARNISH ON A SUBSTRATE

CROSS-REFERENCE TO RELATED APPLICATION

This application is the U.S. national phase of PCT Application No. PCT/CN2013/080793 filed on Aug. 5, 2013, which claims priority to Chinese Patent Application No. 201310223543.5 filed on Jun. 6, 2013, the disclosures of which are incorporated in their entirety by reference herein.

BACKGROUND OF THE INVENTION

Field of the Invention

The present invention relates to the technical field of protective coating materials, and in particular, to a fluorine-modified epoxy acrylic resin, an UV-curable varnish prepared based on the fluorine-modified epoxy acrylic resin and method for preparing the same, and a method for coating the UV-curable varnish on a substrate.

Description of the Prior Art

Ultraviolet-curable varnish (or called UV-curable varnish) is widely used on the surface of materials such as books, packaging materials (for example, tobacco cartridge), metal materials and glass articles, etc., and it plays various roles of beautification, corrosion protection and scrape protection, etc., thereby the service life and the appearance of the material may be improved.

With the development of electronic technologies, UV-curable varnish is also widely used in the field of touch screens of electronic products such as mobile phone, Pad, electronic book and automatic teller machine (ATM), etc. At present, the touch screen of an electronic product has transformed from a traditional display part to a display-input integrated part. As is different from the traditional push-key type and keyboard type input method, touch-type input method realizes the object of information input via the direct contact of a tool or a finger with a touch screen. Especially, with the development of capacitive touch screen, the finger touching input method is used more and more widely. Therefore, it attracts a wider attention how to extend the service life of the touch screen. In a common method for extending the service life of a touch screen, an insulating coating is coated on the surface of the touch screen to prevent the direct contact of a finger with the screen that generates electrical signals and extend the service life of the touch screen. The insulating coating generally used is UV-curable varnish. However, due to the insufficient performance of the current UV-curable varnish and the selection of materials, the UV-curable varnish cannot meet the application requirements of modern touch screens especially in the performance of surface hardness, adhesion, frictional resistance, heat-shock resistance, hand-sweat resistance and fingerprint resistance, etc. Therefore, it attracts a wide attention how to develop a UV-curable varnish that can solve the above defects.

SUMMARY OF THE INVENTION

It is an object of the present invention to provide a fluorine-modified epoxy acrylic resin that is used in a UV-curable varnish.

Further, it is an object of the invention to provide an UV-curable varnish prepared based on a fluorine-modified epoxy acrylic resin, wherein the UV-curable varnish is excellent on at least one performance of surface hardness, adhesion, hand-sweat resistance and fingerprint resistance, etc., thereby the material itself may be protected and the service life of the material may be extended.

Further, it is an object of the invention to provide a method for preparing an UV-curable varnish.

Further, it is an object of the invention to provide a method for coating an UV-curable varnish on a substrate.

The above objects of the invention are realized by the following technical solutions.

According to one aspect of the invention, there provides a fluorine-modified epoxy acrylic resin, which is prepared by a process including the following steps: generating an epoxy acrylic resin via a ring-opening esterification reaction between an unsaturated mono-carboxylic acid and at least one epoxy group in an epoxy resin; and generating an epoxy acrylic resin containing fluorinated side groups via an esterification reaction between a fluorocarboxylic acid or a fluorocarboxylic acid anhydride and at least one hydroxy group in the epoxy acrylic resin, thus obtaining the fluorine-modified epoxy acrylic resin.

According to another aspect of the invention, there provides an UV-curable varnish comprising the above fluorine-modified epoxy acrylic resin.

According to one preferred embodiment, the UV-curable varnish comprises 20-50 parts by weight of fluorine-modified epoxy acrylic resin, 10-30 parts by weight of UV-curable resin, 5-30 parts by weight of acrylate monomer, 1-7 parts by weight of photoinitiator, 10-40 parts by weight of filler and 4-10 parts by weight of additives.

According to another aspect of the invention, there provides a method for preparing the UV-curable varnish, which comprises: mixing a photoinitiator and an acrylate monomer and dissolving the photoinitiator in the acrylate monomers; adding fluorine-modified epoxy acrylic resin, UV-curable resin and additives, and stirring to make them mixed uniformly; adding a filler, stirring to make it dispersed and mixed uniformly, and then standing, preferably standing for at least 10 minutes to make fillers wetted fully; and grinding the mixed dispersion, thereby obtaining an UV-curable varnish.

According to another aspect of the invention, there provides a method for coating an UV-curable varnish on a substrate, which comprises: diluting an UV-curable varnish to a desirable viscosity via a solvent; coating the diluted UV-curable varnish on a substrate via screen printing or offset printing; and irradiating the coated film layer with ultraviolet light by an ultraviolet light irradiation device, and curing the coated film layer.

The invention provides a novel fluorine-modified epoxy acrylic resin, and an UV-curable varnish with excellent performance is prepared based on the resin. The method for coating an UV-curable varnish according to the invention is simple, and when the UV-curable varnish is coated on the surface of a substrate, at least one performance of the material, such as surface hardness, hand-sweat resistance, fingerprint resistance and the adhesion between film layer and substrate, etc., may be improved, especially the performance, such as hand-sweat resistance or fingerprint resistance, etc., may be improved, so that the service life of the material itself may be improved.

DETAILED DESCRIPTION OF THE PREFERRED EMBODIMENTS

Because the UV-curable varnish according to the invention comprises a novel fluorine-modified epoxy acrylic resin, at least one performance of the material, such as surface hardness, adhesion, frictional resistance, heat-shock resistance, hand-sweat resistance and fingerprint resistance, etc., will be improved. Further, by adjusting the compositions and contents of the UV-curable varnish according to the invention, a protective film layer with excellent performance, especially surface hardness, adhesion, hand-sweat resistance and fingerprint resistance, etc., may be obtained.

According to one aspect of the invention, there provides a fluorine-modified epoxy acrylic resin, which is prepared by a process including the following steps: first of all, generating an epoxy acrylic resin via a ring-opening esterification reaction between an unsaturated mono-carboxylic acid and at least one epoxy group in an epoxy resin; next, generating an epoxy acrylic resin containing fluorinated side groups via an esterification reaction between a fluorocarboxylic acid or a fluorocarboxylic acid anhydride and at least one hydroxy group in the epoxy acrylic resin, thus obtaining the fluorine-modified epoxy acrylic resin according to the invention.

The fluorine-modified epoxy acrylic resin according to the invention is prepared by a typical two-stage esterification reaction, specifically as follows:

First of all, a ring-opening esterification reaction occurs between an unsaturated mono-carboxylic acid and at least one epoxy group in an epoxy resin, that is, ring-opening of the epoxy group in an epoxy resin occurs, and reacts with a carboxylic acid group in the unsaturated mono-carboxylic acid to generate an ester group and a hydroxy group.

For example, when the epoxy group is located at the terminal position of the epoxy resin chain, its reaction with the unsaturated mono-carboxylic acid is as shown by the formula below:

CH$_2$(O)CH—+R$_1$COOH→R$_1$COOCH$_2$—CH(OH)— Formula (1)

When the epoxy group is located at the mid position of the epoxy resin chain, its reaction with the unsaturated mono-carboxylic acid is as shown by the formula below:

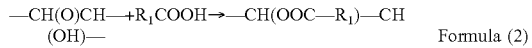

—CH(O)CH—+R$_1$COOH→—CH(OOC—R$_1$)—CH(OH)— Formula (2)

Wherein, R$_1$ in the unsaturated mono-carboxylic acid R$_1$COOH of the above formulae (1) and (2) is an unsaturated alkyl, preferably an olefinic alkyl.

Next, an esterification reaction is carried out between a fluorocarboxylic acid or a fluorocarboxylic acid anhydride and at least one hydroxy group in the epoxy acrylic resin prepared above, wherein, the hydroxy group is a hydroxy group generated from the original hydroxy group or epoxy resin unit in the epoxy resin via ring opening of the epoxy group, and the specific reaction formula thereof is as shown below:

R$_1$COOCH$_2$—CH(OH)—+R$_2$COOH→R$_1$COOCH$_2$—CH(OOCR$_2$)— formula (3)

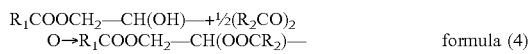

R$_1$COOCH$_2$—CH(OH)—+½(R$_2$CO)$_2$O→R$_1$COOCH$_2$—CH(OOCR$_2$)— formula (4)

Or

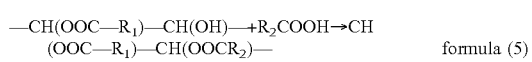

—CH(OOC—R$_1$)—CH(OH)—+R$_2$COOH→CH(OOC—R$_1$)—CH(OOCR$_2$)— formula (5)

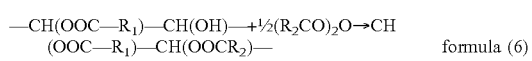

—CH(OOC—R$_1$)—CH(OH)—+½(R$_2$CO)$_2$O→CH(OOC—R$_1$)—CH(OOCR$_2$)— formula (6)

Wherein, R$_2$ in the above fluorocarboxylic acid R$_2$COOH or fluorocarboxylic acid anhydride (R$_2$CO)$_2$O is fluoroalkyl.

After the above two-stage reaction, an epoxy acrylic resin containing fluorinated side groups is generated, thus the fluorine-modified epoxy acrylic resin is obtained.

Generally, two or more epoxy groups are contained in the epoxy resin. In the ring-opening esterification reaction of the invention, an esterification reaction generally occurs between an unsaturated mono-carboxylic acid and at least one epoxy group in an epoxy resin. The number of epoxy groups on which ring-opening esterification reaction occurs with the unsaturated mono-carboxylic acid depend on the number of epoxy groups in the epoxy resin or the epoxy equivalent. For example, the ring-opening esterification reaction occurs between one, two or three epoxy groups in the epoxy resin and the unsaturated mono-carboxylic acid. Additionally, an esterification reaction may occur on both the hydroxy groups, which is generated during the esterification reaction on the unsaturated mono-carboxylic acid with at least one epoxy group in an epoxy resin, and the hydroxy groups in the epoxy resin itself with the fluorocarboxylic acid or fluorocarboxylic acid anhydride. In the preparation method of the invention, an esterification reaction generally occurs on the fluorocarboxylic acid or fluorocarboxylic acid anhydride with at least one hydroxy group in the epoxy resin, so that an epoxy acrylic resin containing fluorinated side groups, i.e., the fluorine-modified epoxy acrylic resin of the invention, is generated.

According to one preferred embodiment of the invention, the epoxy resin may be any type of epoxy resin; for example, it may at least one of polyphenol-type glycidyl ether-type epoxy resin, aliphatic polyhydric alcohol glycidyl ether-type epoxy resin, glycidyl ester-type epoxy resin and glycidyl amine-type epoxy resin. More preferably, the epoxy resin is at least one selected from bisphenol A-type epoxy resin, bisphenol F-type epoxy resin, aliphatic glycidyl ether epoxy resin and polyethyleneglycol diglycidyl ether epoxy resin. The epoxy resin of the invention has no limitation on the epoxy equivalent thereof; for example, the epoxy equivalent may be 2-1000, 50-500, 100-350 or 120-300.

According to one preferred embodiment of the invention, the unsaturated mono-carboxylic acid is preferably a mono-carboxylic acid containing an olefinic unsaturated alkyl. For example, it may be at least one of acrylic acid, methacrylic acid, butenoic acid, methylcrotonic acid, pentenoic acid and methylpentenoic acid. Preferably, the unsaturated mono-carboxylic acid is acrylic acid and/or methacrylic acid.

According to one preferred embodiment of the invention, the fluorocarboxylic acid or the fluorocarboxylic acid anhydride is any carboxylic acid containing fluoro atom. Preferably, the fluorocarboxylic acid or the fluorocarboxylic acid anhydride is at least one selected from perfluoroheptanoic acid, perfluorocaprylic acid, perfluorononanoic acid, perfluorododecanic acid and trifluoroacetic acid, and the anhydrides thereof. Most preferably, it is trifluoroacetic acid or trifluoroacetic anhydride.

According to a further preferred embodiment of the invention, the epoxy resin is bisphenol F-type epoxy resin, the unsaturated mono-carboxylic acid is acrylic acid, and the fluorocarboxylic acid or anhydride is trifluoroacetic anhydride.

According to another further preferred embodiment of the invention, the epoxy resin is bisphenol A-type epoxy resin, the unsaturated mono-carboxylic acid is methacrylic acid, and the fluorocarboxylic acid or anhydride is trifluoroacetic anhydride.

According to another further preferred embodiment of the invention, the epoxy resin is polyethyleneglycol diglycidyl ether-type epoxy resin, the unsaturated mono-carboxylic acid is methacrylic acid, and the fluorocarboxylic acid or anhydride is perfluorocaprylic acid.

For example, when the epoxy resin is bisphenol F-type epoxy resin, the unsaturated mono-carboxylic acid is acrylic acid, and the fluorocarboxylic acid or the fluorocarboxylic acid anhydride is trifluoroacetic acid or trifluoroacetic anhydride, one structure of the fluorine-modified epoxy acrylic resin prepared may be represented by the formula below:

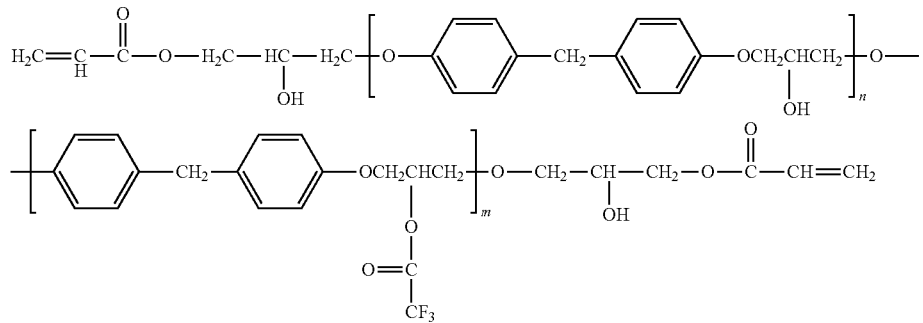

Wherein, n and m are independent positive integers.

According to another aspect of the invention, there provides an UV-curable varnish comprising the above fluorine-modified epoxy acrylic resin.

According to one preferred embodiment of the invention, the ultraviolet curing varnish comprises 20-50 parts by weight of the fluorine-modified epoxy acrylic resin, 10-30 parts by weight of UV-curable resin, 5-30 parts by weight of acrylate monomer, 1-7 parts by weight of photoinitiator, 10-40 parts by weight of filler and 4-10 parts by weight of additives.

According to one preferred embodiment of the invention, the fluorine-modified epoxy acrylic resin is 25-40 parts by weight, and more preferably, 20-35 parts by weight.

According to one preferred embodiment of the invention, the UV-curable resin is at least one selected from polyurethane acrylic resin, polyester acrylic resin, epoxy acrylic resin and polysilane acrylic resin. Most preferably, the UV-curable resin is polyurethane acrylic resin. More preferably, the functionality of the UV-curable resin is between 1-5, and more preferably in the range from 2 to 4.

According to one preferred embodiment of the invention, the amount of the UV-curable resin is 15-30 parts by weight, and more preferably 15-20 parts by weight.

According to one preferred embodiment of the invention, the acrylate monomer may be any acrylate-type monomer, including, but not limited to, at least one of methyl acrylate (MA), methyl methacrylate (MMA), trimethylolpropane triacrylate (TMPTA), isobornyl acrylate (IBOA), dipropyleneglycol diacrylate (DPGDA), dipentaerythritol hexaacrylate (DPHA) and 1,6-hexanediol diacrylate (HDDA).

According to one preferred embodiment of the invention, the amount of the acrylate monomer is 10-29 parts by weight, and more preferably, 15-25 parts by weight.

According to one preferred embodiment of the invention, the photoinitiator is at least one selected from 2,4,6-trimethylbenzoyl-diphenyl phosphine oxide (TPO), ethyl (2,4,6-trimethylbenzoyl)phenylphosphinate (TPO-L), 2-hydroxyl-2-methyl-1-phenyl-1-acetone (1173), 1-hydroxyl-cyclohexyl-phenylketone (184) and benzoin dimethyl ether (BDK). Preferably, the photoinitiator is 1-hydroxyl-cyclo- hexyl-phenylketone (184) and/or 2,4,6-trimethylbenzoyl-diphenyl phosphine oxide (TPO).

According to one preferred embodiment of the invention, the amount of the photoinitiator is 2-7 parts by weight, more preferably 3-7 parts by weight, and most preferably 3-6 parts by weight.

According to one preferred embodiment of the invention, the filler is at least one selected from barium sulphate, talcum powder, matt powder, organobentonite, gas silicon dioxide, heavy calcium carbonate and light calcium carbonate. Most preferably, the filler is one or more selected from barium sulphate, talcum powder and gas silicon dioxide.

According to one preferred embodiment of the invention, the dosage of the filler is 10-35 parts by weight, preferably 10-30 parts by weight, and more preferably 10-25 parts by weight.

According to one preferred embodiment of the invention, the additives comprises 2-5 parts by weight of levelling agent, 1.5-3 parts by weight of dispersing agent, 0.5-2 parts by weight of defoamer, 0-1 parts by weight of surface additive and 0-1.5 parts by weight of wax additive.

Further, for the purpose of decoration and so on, a pigment may be added to the UV-curable varnish to prepare protective films of different colors. The pigment includes, but is not limited to, inorganic pigment and organic pigment, etc.; for example, the pigment may be phthalocyanine blue, phthalocyanine green, 254 red and 180 yellow, etc. A mixture of one or more pigments may be selected and added. Additionally, the dosage of the pigment added is not limited, which mainly depends on the color requirement on the protective film.

According to a further aspect of the invention, there provides a method for preparing the above UV-curable varnish, which includes: mixing a photoinitiator with acrylate monomers, and dissolving the photoinitiator in the acrylate monomers; adding fluorine-modified epoxy acrylic resin, UV-curable resin and additives, and stirring to make them mixed uniformly; adding fillers and stirring to make fillers dispersed and mixed uniformly, and then standing preferably for at least 10 minutes to make fillers wetted fully; and grinding the mixed dispersion, thereby obtaining an UV-curable varnish.

According to one preferred embodiment of the invention, the above stirring, dispersing and mixing are performed via a high-speed dispersion machine. More preferably, the dispersion is ground to a grain size of less than 10 μm for the solid particles contained therein.

According to a further aspect of the invention, there provides a method for coating the above UV-curable varnish on a substrate, which includes: diluting an UV-curable varnish to a desirable viscosity via a solvent; coating the diluted UV-curable varnish on a substrate via screen printing or offset printing; and irradiating the coated film layer by an ultraviolet light irradiation device, and curing the coated film layer.

According to the type and application requirement of the coating process, the UV-curable varnish is diluted to a certain viscosity via a solvent, preferably to 5-300 Pa·s, and more preferably, to 20-200 Pa·s. Preferably, the solvent used for diluting includes, but is not limited to, methyl acrylate (MA), methyl methacrylate (MMA), trimethylolpropane triacrylate (TMPTA), isobornyl acrylate (IBOA), dipropyleneglycol diacrylate (DPGDA), dipentaerythritol hexaacrylate (DPHA), and 1,6-hexanediol diacrylate (HDDA), etc., and it may be formed by selecting and mixing one or more of the above solvents. The dosage thereof is determined according to the final viscosity of the UV-curable varnish intended. Preferably, the solvent used for diluting is the same as the acrylate monomer used in the UV-curable varnish.

Preferably, the irradiation device selected for curing the UV-curable varnish according to the invention includes, but is not limited to: low-pressure, medium pressure and high-pressure mercury lamp; LED light source; or other devices that may emit a ultraviolet-light wave band. Preferably, a high-pressure mercury lamp is used. The wavelength of the ultraviolet light is in the range of 200-400 nm, and the irradiation energy is in the range of 400-1800 mJ/cm$^2$, preferably 500-1200 mJ/cm$^2$, and more preferably 600-800 mJ/cm$^2$ (the irradiation energy of wavelength $\lambda$=365 nm is taken as a reference standard).

Further, the substrate is preferably at least one selected from metal, paper, optical glass, FTP glass and ITO ceramics.

Based on the description of the above specific implementation modes of the invention, especially preferred implementation modes of the invention will be further described in detail. But, the protection scope of the invention will not be limited to such specific implementation modes or the specific embodiments below.

According to an especially preferred embodiment of the invention, there provides a method for preparing a fluorine-modified epoxy acrylic resin, and a fluorine-modified epoxy acrylic resin prepared by the method. The method includes the steps of:

generating an epoxy acrylic resin via a ring-opening esterification reaction between an unsaturated mono-carboxylic acid and at least one epoxy group in an epoxy resin, wherein the reaction is carried out in a first solvent at a reflux temperature (for example, in toluene at a boiling reflux temperature), and preferably, a small amount of concentrated sulphuric acid is added as a catalyst to accelerate the reaction; and generating an epoxy acrylic resin containing fluorinated side groups via an esterification reaction between a fluorocarboxylic acid or a fluorocarboxylic acid anhydride and at least one hydroxy group in the epoxy acrylic resin prepared above, wherein the reaction is carried out in a second solvent, for example tetrahydrofuran, at about ice water temperature (for example, −5° C.-5° C.), and preferably, triethylamine is added as a catalyst to accelerate the reaction.

More preferably, excess equivalent weight of unsaturated mono-carboxylic acid relative to the epoxy group in the epoxy resin is reacted with at least one epoxy group in an epoxy resin. For example, relative to the epoxy group in the epoxy resin, the unsaturated mono-carboxylic acid has an equivalent weight of 1.1-1.5, preferably, an equivalent weight of 1.1.

More preferably, before the first-stage reaction starts, a polymerization inhibitor, for example, hydroquinone, may be added to reduce or prevent the polymerising and curing of the prepared epoxy acrylic resin at a high temperature, for example, a temperature not less than 200° C.

More preferably, relative to the epoxy group in the epoxy resin, the dosage of the polymerization inhibitor added, for example, hydroquinone, has an equivalent weight of 0.01%-2%, preferably an equivalent weight of 0.1%.

More preferably, an esterification reaction is carried out on a fluorocarboxylic acid or a fluorocarboxylic acid anhydride of an equivalent weight that is excess relative to the epoxy group in the epoxy resin with at least one hydroxy group in the epoxy acrylic resin prepared above. For example, relative to the epoxy group in the epoxy resin, the fluorocarboxylic acid or fluorocarboxylic acid anhydride has an equivalent weight of 1.1-5, preferably, an equivalent weight of 3.

More preferably, relative to the epoxy group in the epoxy resin, the dosage of the catalyst added, for example, triethylamine, has an equivalent weight of 1-6, and preferably, an equivalent weight of 4.

More preferably, in order to prepare a purified fluorine-modified epoxy acrylic resin, a washing and separating step may be performed on the products from the first-stage reaction or the second-stage reaction. For example, the pH value of the reaction solution system obtained after the first-stage reaction is adjusted to neutral by a sodium bicarbonate aqueous solution, and the organic phase (toluene phase) is washed with deionized water to remove the inorganic ion therein, then the moisture in the toluene phase is deprived via anhydrous magnesium sulphate, and then the solvent is remove via rotary evaporation and separation, thus a basically purified epoxy acrylic resin is obtained. For example, the products prepared from the second-stage reaction is extracted via an extractant; and similarly, a basically purified fluorine-modified bisphenol F-type epoxy acrylic resin is prepared by typical technologies of the art such as pH value adjustment, dehydration and rotary evaporation and separation, etc.

EMBODIMENT

Embodiment 1

Preparation of Fluorine-Modified Bisphenol F-Type Epoxy Acrylic Resin (Resin I)

Weigh 100 g of bisphenol F-type epoxy resin (purchased from Dow Chemical Company, product model number DER 354, epoxy equivalent: 168-175), add 46.6 g acrylic acid (with an equivalent weight of 1.1 relative to the epoxy group in the epoxy resin), 0.06 g hydroquinone (with an equivalent weight of 0.1% relative to the epoxy group in the epoxy resin), 50 g toluene and 1 g concentrated sulphuric acid, and reflux-react for 4 hours at toluene boiling temperature. Stop the reaction, and cool the reaction solution to room temperature. Wash the reaction solution to neutral with 1 wt % sodium bicarbonate aqueous solution, and wash the toluene phase with 20 ml deionized water for three times. Add anhydrous magnesium sulphate into the toluene phase, and stand over night. Finally, after filtration and reduced-pressure rotary evaporation, 124 g bisphenol F-type epoxy acrylic resin is obtained.

Dissolve the above prepared 124 g bisphenol F-type epoxy acrylic resin in 300 ml tetrahydrofuran, add 237 g triethylamine (with an equivalent weight of 4 relative to the epoxy group in the epoxy resin), add dropwise 370 g trifluoroacetic anhydride (with an equivalent weight of 3 relative to the epoxy group in the epoxy resin) in ice water bath, and stir to react over night. Carry out reduced-pressure rotary evaporation on the reaction solution to remove the solvent, and obtain a viscous liquid. Dissolve the liquid in 200 ml normal hexane, and wash with 30 ml 1 wt % sodium bicarbonate aqueous solution; then, wash the solution to neutral with 30 ml 1 wt % hydrochloric acid. Add anhydrous magnesium sulphate into the normal hexane phase, and stand over night. Then, carry out filtration and reduced-pressure rotary evaporation, and fluorine-modified bisphenol F-type epoxy acrylic resin is obtain.

As indicated by an infrared spectrum test, the infrared spectrum spectrogram of the fluorine-modified bisphenol F-type epoxy acrylic resin obtained includes the following characteristic peaks: absorption peak of carbonyl from acrylate group: 1690 $cm^{-1}$; absorption peak of carbonyl from trifluoroacetate group: 1732 $cm^{-1}$; and C—F absorption peak: 1382 $cm^{-1}$.

Embodiment 2

Preparation of Fluorine-Modified Bisphenol A-Type Epoxy Acrylic Resin (Resin II)

Weigh 100 g of bisphenol A-type epoxy resin (purchased from Dow Chemical Company, product model number: DER 331J, epoxy equivalent: 186-190), add 49.7 g methacrylic acid (with an equivalent weight of 1.1 relative to the epoxy group in the epoxy resin), 0.06 g hydroquinone (equivalent weight 0.1% relative to the epoxy group in the epoxy resin), 50 g toluene and 1 g concentrated sulphuric acid, and reflux-react for 4 hours at toluene boiling temperature. Stop the reaction, and cool to room temperature, wash the reaction solution to neutral with 1 wt % sodium bicarbonate aqueous solution, and then wash the toluene phase with 20 ml deionized water for three times. Add anhydrous magnesium sulphate into the toluene phase, and stand over night. Then, carry out filtration and reduced-pressure rotary evaporation, and 126 g bisphenol A-type epoxy methacrylate resin is obtained.

Dissolve the above prepared 126 g bisphenol A-type epoxy acrylic resin in 300 ml tetrahydrofuran, add 212 g triethylamine (with an equivalent weight of 4 relative to the epoxy group in the epoxy resin), add dropwise 179.9 g trifluoroacetic acid (with an equivalent weight of 3 relative to the epoxy group in the epoxy resin) in ice water bath, and stir to react over night. Remove the solvent via reduced-pressure rotary evaporation, and obtain a viscous liquid. Dissolve the liquid in 200 ml normal hexane, and wash with 30 ml 1 wt % sodium bicarbonate aqueous solution; then, wash the solution to neutral with 30 ml 1 wt % hydrochloric acid. Add anhydrous magnesium sulphate into the normal hexane phase, and stand over night. Finally, after filtration and reduced-pressure rotary evaporation, a fluorine-modified bisphenol A-type epoxy acrylic resin is obtained.

As indicated by an infrared spectrum test, the infrared spectrum spectrogram of the fluorine-modified bisphenol A-type epoxy acrylic resin obtained includes the following characteristic peaks: absorption peak of carbonyl from methacrylate group: 1690 $cm^{-1}$; absorption peak of carbonyl from trifluoroacetate group: 1732 $cm^{-1}$; and C—F absorption peak: 1382 $cm^{-1}$.

Embodiment 3

Preparation of Fluorine-Modified Polyethyleneglycol Diglycidyl Ether Epoxy Acrylic Resin (Resin III)

Weigh 100 g of polyethyleneglycol diglycidyl ether epoxy resin (purchased from Dow Chemical Company, product model number: DER 732, epoxy equivalent: 310-330), add 24 g methacrylic acid (with an equivalent weight of 1.1 relative to the epoxy group in the epoxy resin), 0.03 g hydroquinone (equivalent weight 0.1% relative to the epoxy group in the epoxy resin), 50 g toluene, and 1 g concentrated sulphuric acid, and reflux-react at toluene boiling temperature for 4 hours. Stop the reaction, and cool the reaction solution to room temperature, wash the reaction solution to neutral with 1 wt % sodium bicarbonate aqueous solution, and then wash the toluene phase with 20 ml deionized water for three times. Add anhydrous magnesium sulphate into the toluene phase, and stand over night. Finally, after filtration and reduced-pressure rotary evaporation, 101 g polyethyleneglycol diglycidyl ether epoxy acrylic resin is obtained.

Dissolve the above prepared 101 g epoxy acrylic resin in 300 ml tetrahydrofuran, add 121 g triethylamine (with an equivalent weight of 4 relative to the epoxy group in the epoxy resin), and add dropwise 372.6 g perfluorocaprylic acid (with an equivalent weight of 3 relative to the epoxy group in the epoxy resin) in ice water bath, and stir to react over night. Remove the solvent via reduced-pressure rotary evaporation, and obtain a viscous liquid. Dissolve the liquid in 200 ml normal hexane, and wash with 30 ml 1 wt % sodium bicarbonate aqueous solution; then, wash the solution to neutral with 30 ml 1 wt % hydrochloric acid. Add anhydrous magnesium sulphate into the normal hexane phase, and stand over night. Finally, after filtration and reduced-pressure rotary evaporation, a fluorine-modified polyethyleneglycol diglycidyl ether-type epoxy acrylic resin is obtained.

As indicated by an infrared spectrum test, the infrared spectrum of the fluorine-modified polyethyleneglycol diglycidyl ether-type epoxy acrylic resin includes the following characteristic peaks: absorption peak of carbonyl from acrylate group: 1692 $cm^{-1}$; absorption peak of carbonyl from perfluorocaprylate group: 1735 $cm^{-1}$; and C—F absorption peak: 1384 $cm^{-1}$.

Embodiment 4

Preparation of UV-Curable Varnish

Weigh 3 parts by weight of photoinitiator 184, 20 parts by weight of acrylate monomer TMPTA and 6 parts by weight of acrylate monomer DPGDA and mix them, and dissolve photoinitiator 184 in acrylate monomer. Then, add 20 parts by weight of the fluorine-modified bisphenol F-type epoxy acrylic resin (resin I) prepared in embodiment 1, 20 parts by weight of polyurethane acrylic resin, 3 parts by weight of levelling agent (Germany BYK Chemie BYK-333), 1 part by weight of defoamer (Germany BYK Chemie BYK052) and 2 parts by weight of dispersing agent (Germany BYK Chemie BYK-163), and disperse and mix them uniformly on a high-speed dispersion machine.

Next, add 17 parts by weight of filler barium sulphate (with an average grain size of 7.5 micrometers), 5 parts by weight of talcum powder (with an average grain size of 7.5 micrometers) and 3 parts by weight of gas silicon dioxide (with an average grain size of 1.3 micrometers), and disperse and mix them uniformly on a high-speed dispersion machine, and then stand for 10-15 minutes to make the filler wetted fully. Thereafter, grind on a three-roll grinder to a solid particle size of less than 10 micrometers, and form an UV-curable varnish.

The viscosity of the above prepared UV-curable varnish is adjusted to 100 Pa·s with acrylate monomer TMPTA. Then, it is printed on a polished copper substrate with a 200-mesh silk screen, and is cured with an energy of 600 mJ/cm² under a high-pressure mercury lamp, so that a protective film is formed on the copper substrate.

Each performance of the film coated and cured on the copper substrate is tested by the method as shown in Table 1 below, wherein the specific test condition and method are as shown in Table 1 below.

TABLE 1

| Test Item | Test Condition or Method |
|---|---|
| Hardness | Pencils (Mitsubish) with a hardness of 6B-9H are employed for testing.<br>Specific Test Step: The pencil core is cut into a cylinder and planished on a 400-mesh abrasive paper, and then it is mounted onto a pencil hardness tester. The load applied on the stylus is 1 Kg, and the included angle between the pencil and the horizontal plane is 45°; the pencil is pushed to slide forward about 5 mm, and totally 5 pencillings are drawn, then the pencillings are wiped off with an eraser, and it is observed whether scratches are left.<br>Test Result: when there is less than 1 scratch on the surface of the film tested, the maximum hardness of the pencil employed will be the tested hardness of the film. |
| Adhesion | One Hundred Grid Method is employed.<br>Specific Test Step: 10 × 10 small grids of 1 mm × 1 mm are scratched on the surface of the test sample with a sharp blade (the blade angle is 15°-30°), and each scratch should deepen into the bottom layer of the film; the scrapings in the test region are wiped off with a hairbrush; the small grids to be tested are stuck firmly by an adhesive tape (3M810) with an adhesive force of 350-400 g/cm², and the adhesive tape is wiped with an eraser hardly to increase the contact area and contact force between the adhesive tape and the tested region; one end of the adhesive tape is grasped by the hand and rapidly pulled off in vertical direction (90°); and the same test is performed twice on one and the same position.<br>Test Result: The number of grids that are not pulled off among the 100 grinds is counted. |
| Wear Resistance | Rubber friction test method is employed.<br>Specific Test Step: A dedicated sand rubber (model number: LER902K) is employed to rub back and forth on the surface of the sample in a stroke of about 20 mm, with a load of 175 g and a speed of 40-60 times per minute. The friction number at the time the paint on the film layer is struck through is measured.<br>Test Result: The friction number at the time the paint on the film layer is struck through is measured, and it is qualified when the friction number reaches above 100. |
| Scrape Resistance | Steel wire ball antifriction test method is employed.<br>Specific Test Step: A 1# steel wool is employed to rub back and forth on the surface of the sample in a stroke of about 20 mm, with a load of 175 g and a speed of 40-60 times per minute. The friction number at the time the paint on the film layer is struck through is measured.<br>Test Result: The back-and-forth scraping number before the paint on the film layer is struck through is measured, and it is qualified when the friction number reaches above 50. |
| Solvent Resistance | Alcohol solvent resistance test method is employed.<br>Specific Test Step: A 100% cotton fabric is dipped with absolute alcohol (concentration ≥99.5%) and wrapped on a dedicated 500 g weight head (the area of the test head is about 1 cm² after the cotton fabric is wrapped), and then it wipes back and forth on the surface of the sample in a stroke of about 20 mm at speed of 40-60 times per minute.<br>Test Result: The back-and-forth wiping number before the paint is struck through is measured, and it is qualified when the friction number reaches above 100. |

TABLE 1-continued

| Test Item | Test Condition or Method |
|---|---|
| Hand-Sweat Resistance | Artificial sweat test method is employed.<br>Specific Test Step: An artificial sweat is prepared, which includes: (1) 100 ml deionized water + (2) 5 g NaCl + (3) 5 g Na$_2$HPO$_4$ + (4) 2 ml 99% acetic acid, with a pH value of about 4.7; the sample is wrapped with a cotton towel soaked with the artificial sweat at 45° C., and the towel is kept wet for 120 hours (5 days) (the sample cannot be direct dipped in the sweat), and it verifies whether the surface of the sample is changed every 24 hours.<br>Test Result: It is qualified when no cracking, bubbling or wearing occurs after the water stain on the surface of the tested article is dried up with cloth and placed at normal temperature for half an hour. |
| Fingerprint Resistance | Method for testing contact angle via water and oleic acid is employed.<br>Specific Test Step: The surface of the sample to be tested is contacted with water, and the contact angle is tested. After the surface of the sample to be tested is washed and dried, it is contacted with oleic acid, and the contact angle is tested.<br>Test Result: It is qualified when the contact angle between the surface of sample to be tested and water is larger than 115° and the contact angle between the surface of sample to be tested and oleic acid is larger than 74°; otherwise, it is unqualified. |
| Heat-Shock Resistance | −40-80° C. heat shock test method is employed.<br>Specific Test Step: The cold and heat shock conditions of a temperature shock test box (WDCJ-162, Beijing Yashilin) are respectively set as: −40° C. ± 2° C. × 40 minutes and 80° C. ± 2° C. × 40 minutes, and the sample is put into the temperature shock test box; after the sample is put into the cold shock test box at −40° C. ± 2° C. for 40 minutes, it is immediately put into the heat shock test box at 80° C. ± 2° C. for 40 minutes; and the sample is taken out and checked after the test is completed.<br>Test Result: It is qualified when no cracking, bubbling or wearing occurs on the film layer or the paint of the tested sample; otherwise, it is unqualified. |

Embodiment 5

Preparation of UV-Curable Varnish

An UV-curable varnish is prepared according to the compounding ratio as shown in Table 2 below by the same steps as those in Embodiment 4. The viscosity of the UV-curable varnish prepared is adjusted to 100 Pa·s with TMPTA, and the UV-curable varnish is printed on a polished copper substrate via a 200-mesh screen and cured under an energy of 600 mJ/cm² by a high-pressure mercury lamp. The performance thereof is tested by the test method shown in Table 1, and the test result is as shown in Table 2.

Embodiment 6

Preparation of UV-Curable Varnish

An UV-curable varnish is prepared according to the compounding ratio as shown in Table 2 below by the same steps as those in Embodiment 4. The viscosity of the UV-curable varnish prepared is adjusted to 100 Pa·s with TMPTA, and the UV-curable varnish is printed on a common optical glass substrate via a 200-mesh screen and cured under an energy of 800 mJ/cm² by a high-pressure mercury lamp. The performance thereof is tested by the test method shown in Table 1, and the test result is as shown in Table 2.

Embodiment 7

Preparation of UV-Curable Varnish

An UV-curable varnish is prepared according to the compounding ratio as shown in Table 2 below by the same steps as those in Embodiment 4. The viscosity of the UV-curable varnish prepared is adjusted to 100 Pa·s with mixed monomers of DPHA:TMPTA=3:1, and the UV-curable varnish is printed on an ITO glass substrate via a 200-mesh screen and cured under an energy of 800 mJ/cm$^2$ by a high-pressure mercury lamp. The performance thereof is tested by the test method shown in Table 1, and the test result is as shown in Table 2.

Embodiment 8

Preparation of UV-Curable Varnish

An UV-curable varnish is prepared according to the compounding ratio as shown in Table 2 below by the same steps as those in Embodiment 4. The viscosity of the UV-curable varnish prepared is adjusted to 5 Pa·s with mixed monomers of DPHA:TMPTA:DPGDA=5:9:7, and the UV-curable varnish is printed on a common optical glass substrate by a rotary offset machine and cured under an energy of 600 mJ/cm$^2$ by a high-pressure mercury lamp. The performance thereof is tested by the test method shown in Table 1, and the test result is as shown in Table 2.

Embodiment 9

Preparation of UV-Curable Varnish

An UV-curable varnish (which employs the resin II prepared in Embodiment 2) is prepared according to the compounding ratio as shown in Table 2 below by the same steps as those in Embodiment 4. The viscosity of the UV-curable varnish prepared is adjusted to 100 Pa·s with TMPTA, and the UV-curable varnish is printed on a common optical glass substrate via a 200-mesh screen and cured under an energy of 800 mJ/cm$^2$ by a high-pressure mercury lamp. The performance thereof is tested by the test method shown in Table 1, and the test result is as shown in Table 2.

Embodiment 10

Preparation of UV-Curable Varnish

An UV-curable varnish (which employs the resin III prepared in Embodiment 3) is prepared according to the compounding ratio as shown in Table 2 below by the same steps as those in Embodiment 4. The viscosity of the UV-curable varnish prepared is adjusted to 100 Pa·s with mixed monomers of DPHA:TMPTA=3:1, and the UV-curable varnish is printed on an ITO glass substrate via a 200-mesh screen and cured under an energy of 800 mJ/cm$^2$ by a high-pressure mercury lamp. The performance thereof is tested by the test method shown in Table 1, and the test result is as shown in Table 2.

Comparative Example 1

Preparation of UV-Curable Varnish

Except that 30 parts by weight of unmodified bisphenol F-type epoxy resin (purchased from Dow Chemical Company, product model number: DER 354, epoxy equivalent: 168-175) is employed, the same steps as those of Embodiment 6 are used to prepare the UV-curable varnish. The viscosity of the UV-curable varnish prepared is adjusted to 100 Pa·s with TMPTA, and the UV-curable varnish is printed on a common optical glass substrate via a 200-mesh screen and cured under an energy of 800 mJ/cm$^2$ by a high-pressure mercury lamp. The performance thereof is tested by the test method shown in Table 1, and the test result is as shown in Table 2.

Comparative Example 2

Preparation of UV-Curable Varnish

Except that 30 parts by weight of unmodified bisphenol A-type epoxy resin (purchased from Dow Chemical Company, product model number: DER 331J, epoxy equivalent: 186-190) is employed, the same steps as those of embodiment 9 are used to prepare the UV-curable varnish. The viscosity of the UV-curable varnish prepared is adjusted to 100 Pa·s with TMPTA, and the UV-curable varnish is printed on a common optical glass substrate via a 200-mesh screen and cured under an energy of 800 mJ/cm$^2$ by a high-pressure mercury lamp. The performance thereof is tested by the test method shown in Table 1, and the test result is as shown in Table 2.

TABLE 2

|  |  | Example 4 | Example 5 | Example 6 | Example 7 | Example 8 |
|---|---|---|---|---|---|---|
| Fluorine-Modified Epoxy Acrylic Resin | Resin I | 20 | 30 | 20 | 50 | 35 |
|  | Resin II |  |  |  |  |  |
|  | Resin III |  |  |  |  |  |
|  | Unmodified epoxy resin |  |  |  |  |  |
| UV-curable Resin | Polyurethane acrylic resin | 20 | 15 | 30 | 10 | 10 |
| Acrylate Monomer | TMPTA | 20 | 15 | 14 | 5 | 9 |
|  | DPGDA | 6 | 5 |  |  | 7 |
|  | DPHA |  |  | 15 |  | 5 |
| Photoinitiator | Photoinitiator 184 | 3 | 5 | 5 | 3 | 3 |
|  | TPO |  |  | 2 |  | 1 |
| Filler | Barium sulphate | 17 | 11 | 6.5 | 6 | 7 |
|  | Talcum powder | 5 | 5 | 1 | 5 | 5 |
|  | Gas silicon dioxide | 3 | 3 | 2.5 | 3 | 2 |
|  | Matt powder |  | 5 |  | 8 | 8 |
| Additives | Levelling agent | 3 | 3 | 2 | 5 | 3 |

TABLE 2-continued

| | | | | | | |
|---|---|---|---|---|---|---|
| | Defoamer | 1 | 1 | 0.5 | 2 | 1 |
| | Dispersing agent | 2 | 2 | 1.5 | 3 | 2 |
| | Polymerisable silicane surfactant | | | | | 0.5 |
| | Wax additive | | | | | 1.5 |
| Performance Test | Test condition | | | | | |
| Hardness | Pencil test method | 5H | 6H | 6H | 6H | 6H |
| Adhesion | One hundred grid method | 100/100 | 100/100 | 99/100 | 99/100 | 100/100 |
| Wear Resistance | Rubber mill | >100 times | >100 times | >100 times | >100 times | >100 times |
| Scrape Resistance | 1# steel wool | >50 times | >50 times | >50 times | >50 times | >50 times |
| Solvent Resistance | Absolute alcohol | >100 times | >100 times | >100 times | >100 times | >100 times |
| Hand-Sweat Resistance | Artificial sweat test | Qualified | Qualified | Qualified | Qualified | Qualified |
| Fingerprint Resistance | Contact angle test | Qualified | Qualified | Qualified | Qualified | Qualified |
| Heat-Shock Resistance | −40° c. to 80° c. Temperature Test | Qualified | Qualified | Qualified | Qualified | Qualified |

| | | Example 9 | Example 10 | Comparative Example 1 | Comparative Example 2 |
|---|---|---|---|---|---|
| Fluorine-Modified Epoxy Acrylic Resin | Resin I | | | | |
| | Resin II | 30 | | | |
| | Resin III | | 30 | | |
| | Unmodified epoxy resin | | | 20 (DER354) | 30 (DER331J) |
| UV-curable Resin | Polyurethane acrylic resin | 15 | 15 | 30 | 15 |
| Acrylate Monomer | TMPTA | 5 | 5 | 14 | 5 |
| | DPGDA | | | | |
| | DPHA | 15 | 15 | 15 | 15 |
| Photoinitiator | Photoinitiator 184 | 5 | 5 | 5 | 5 |
| | TPO | 1.5 | | 2 | 1.5 |
| Filler | Barium sulphate | 6.5 | 7.5 | 6.5 | 6.5 |
| | Talcum powder | 5 | 5 | 1 | 5 |
| | Gas silicon dioxide | 3 | 3 | 2.5 | 3 |
| | Matt powder | 8 | 8 | | 8 |
| Additives | Levelling agent | 3 | 3 | 2 | 3 |
| | Defoamer | 1 | 1 | 0.5 | 1 |
| | Dispersing agent | 2 | 2.5 | 1.5 | 2 |
| | Polymerisable silicane surfactant | | | | |
| | Wax additive | | | | |
| Performance Test | Test condition | | | | |
| Hardness | Pencil test method | 7H | 7H | 4H | 4H |
| Adhesion | One hundred grid method | 100/100 | 100/100 | 93/100 | 94/100 |
| Wear Resistance | Rubber mill | >100 times | >100 times | >100 times | >100 times |
| Scrape Resistance | 1# steel wool | >50 times | >50 times | >50 times | >50 times |
| Solvent Resistance | Absolute alcohol | >100 times | >100 times | >100 times | >100 times |
| Hand-Sweat Resistance | Artificial sweat test | Qualified | Qualified | Unqualified | Unqualified |
| Fingerprint Resistance | Contact angle test | Qualified | Qualified | Unqualified | Unqualified |
| Heat-Shock Resistance | −40° c. to 80° c. Temperature Test | Qualified | Qualified | Qualified | Qualified |

It may be seen from the above Table 2 that, in comparison with the Comparative Examples 1-2 that employ an unmodified epoxy acrylic resin, because the fluorine-modified epoxy acrylic resin according to the invention is employed as the composition of the UV-curable varnish in Embodiments 4-9, it is more excellent in the aspects of surface hardness, adhesion between protective film layer and substrate, hand-sweat resistance and fingerprint resistance for a protective film layer prepared from the varnish; especially, apparent improvements are achieved in the performances of hand-sweat resistance and fingerprint resistance.

What is claimed is:

1. A fluorine-modified epoxy acrylic resin containing fluorinated side groups, wherein all fluorine in the fluorine-modified epoxy acrylic resin are contained in the fluorinated side groups derived from a fluorocarboxylic acid or a fluorocarboxylic acid anhydride, wherein the fluorinated side groups are attached to a backbone of an epoxy acrylic resin through an ester group which comprises an acyl group derived from the fluorocarboxylic acid or the fluorocarboxylic acid anhydride, and wherein the fluorocarboxylic acid or the fluorocarboxylic acid anhydride is used to react with at least one hydroxy group in an epoxy acrylic resin for preparing the fluorine-modified epoxy acrylic resin containing fluorinated side groups.

2. The fluorine-modified epoxy acrylic resin according to claim 1, wherein, the epoxy resin is at least one selected from bisphenol A-type epoxy resin, bisphenol F-type epoxy resin and aliphatic glycidyl ether epoxy resin.

3. The fluorine-modified epoxy acrylic resin according to claim 1, wherein, the fluorocarboxylic acid or the fluorocarboxylic acid anhydride is at least one selected from perfluoroheptanoic acid, perfluorocaprylic acid, perfluorononanoic acid, perfluorododecanic acid and trifluoroacetic acid, and the anhydrides thereof.

4. A UV-curable varnish, comprising a fluorine-modified epoxy acrylic resin, wherein all fluorine in the fluorine-modified epoxy acrylic resin are contained in the fluorinated side groups derived from a fluorocarboxylic acid or a fluorocarboxylic acid anhydride, wherein the fluorinated side groups are attached to a backbone of an epoxy acrylic resin through an ester group which comprises an acyl group derived from the fluorocarboxylic acid or the fluorocarboxylic acid anhydride, and wherein the fluorocarboxylic acid or the fluorocarboxylic acid anhydride is used to react with at least one hydroxy group in an epoxy acrylic resin for preparing the fluorine-modified epoxy acrylic resin containing fluorinated side groups.

5. The UV-curable varnish according to claim 4, wherein, the UV-curable varnish comprises 20-50 parts by weight of the fluorine-modified epoxy acrylic resin, 10-30 parts by weight of UV-curable resin, 5-30 parts by weight of acrylate monomer, 1-7 parts by weight of photoinitiator, 10-40 parts by weight of filler and 4-10 parts by weight of additives.

6. The UV-curable varnish according to claim 5, wherein, the UV-curable resin is at least one selected from polyurethane acrylic resin, polyester acrylic resin, epoxy acrylic resin and polysilane acrylic resin.

7. The UV-curable varnish according to claim 5, wherein, the functionality of the UV-curable resin is in the range from 2 to 4.

8. The UV-curable varnish according to claim 5, wherein, the acrylate monomer is at least one selected from methyl acrylate, methyl methacrylate, trimethylolpropane triacrylate, isobornyl acrylate, dipropyleneglycol diacrylate, dipentaerythritol hexaacrylate and 1,6-hexanediol diacrylate.

9. The UV-curable varnish according to claim 5, wherein, the photoinitiator is at least one selected from 2,4,6-trimethylbenzoyl-diphenyl phosphine oxide, ethyl (2,4,6-trimethylbenzoyl) phenylphosphinate, 2-hydroxyl-2-methyl-1-phenyl-1-acetone, 1-hydroxyl-cyclohexyl-phenylketone and benzoin dimethyl ether.

10. The UV-curable varnish according to claim 5, wherein, the filler is at least one selected from barium sulphate, talcum powder, matt powder, organobentonite, gas silicon dioxide, heavy calcium carbonate and light calcium carbonate.

11. The UV-curable varnish according to claim 5, wherein, the additives comprises 2-5 parts by weight of levelling agent, 1.5-3 parts by weight of dispersing agent, 0.5-2 parts by weight of defoamer, 0-1 parts by weight of surface additive and 0-1.5 parts by weight of wax additive.

12. A method for preparing a UV-curable varnish comprising the fluorine-modified epoxy acrylic resin, wherein all fluorine in the fluorine-modified epoxy acrylic resin are contained in the fluorinated side groups derived from a fluorocarboxylic acid or a fluorocarboxylic acid anhydride, wherein the fluorinated side groups are attached to a backbone of an epoxy acrylic resin through an ester group which comprises an acyl group derived from the fluorocarboxylic acid or the fluorocarboxylic acid anhydride, and wherein the fluorocarboxylic acid or the fluorocarboxylic acid anhydride is used to react with at least one hydroxy group in an epoxy acrylic resin for preparing the fluorine-modified epoxy acrylic resin containing fluorinated side groups, the method comprising:

mixing a photoinitiator with acrylate monomers, and dissolving the photoinitiator in the acrylate monomers;

adding fluorine-modified epoxy acrylic resin, UV-curable resin and additives, and stirring to make them mixed uniformly;

adding fillers and stirring to make fillers dispersed and mixed uniformly, and then standing to make fillers wetted fully; and grinding the mixed dispersion, thereby obtaining an UV-curable varnish.

13. The fluorine-modified epoxy acrylic resin according to claim 2, wherein, the fluorocarboxylic acid or the fluorocarboxylic acid anhydride is at least one selected from perfluoroheptanoic acid, perfluorocaprylic acid, perfluorononanoic acid, perfluorododecanic acid and trifluoroacetic acid, and the anhydrides thereof.

14. A method for preparing a fluorine-modified epoxy acrylic resin containing fluorinated side groups, comprising steps of:

generating an epoxy acrylic resin via a reaction between an unsaturated mono-carboxylic acid and at least one epoxy group in an epoxy resin; and generating an epoxy acrylic resin containing fluorinated side groups via a reaction between a fluorocarboxylic acid or a fluorocarboxylic acid anhydride and at least one hydroxy group in the epoxy acrylic resin, thus obtaining the fluorine-modified epoxy acrylic resin containing fluorinated side groups, wherein all fluorine in the fluorine-modified epoxy acrylic resin are contained in the fluorinated side groups derived from a fluorocarboxylic acid or a fluorocarboxylic acid anhydride, wherein the fluorinated side groups are attached to a backbone of an epoxy acrylic resin through an ester group which comprises an acyl group derived from the fluorocarboxylic acid or the fluorocarboxylic acid anhydride, and wherein the fluorocarboxylic acid or the fluorocarboxylic acid anhydride is used to react with at least one hydroxy group in an epoxy acrylic resin for preparing the fluorine-modified epoxy acrylic resin containing fluorinated side groups.

15. The method according to claim 14, wherein, the epoxy resin is at least one selected from bisphenol A-type epoxy resin, bisphenol F-type epoxy resin and aliphatic glycidyl ether epoxy resin.

16. The method according to claim 14, wherein, the fluorocarboxylic acid or the fluorocarboxylic acid anhydride is at least one selected from perfluoroheptanoic acid, perfluorocaprylic acid, perfluorononanoic acid, perfluorododecanic acid and trifluoroacetic acid, and the anhydrides thereof.

\* \* \* \* \*